United States Patent [11] 3,621,085

| [72] | Inventor | Rinjiro Ichikawa<br>Ootsu, Japan |
| [21] | Appl. No. | 808,940 |
| [22] | Filed | Mar. 20, 1969 |
| [45] | Patented | Nov. 16, 1971 |
| [73] | Assignee | Toyo Boseki Kabushiki Kaisha<br>Osaka, Japan |
| [32] | Priorities | Mar. 28, 1968 |
| [33] | | Japan |
| [31] | | 43/20590;<br>June 7, 1968, Japan, No. 43/39325 |

[54] PRODUCTION OF LIGHT-POLARIZING FILM
5 Claims, 5 Drawing Figs.

[52] U.S. Cl. .................................................. 264/2,
260/91.7, 260/96, 264/210, 264/216, 264/235,
264/288, 264/346
[51] Int. Cl. ..................................................... B29c 25/00,
B29d 11/00, B29d 7/24
[50] Field of Search ........................................... 264/2, 210,
346, 235, 216, 288, 83; 350/154; 260/96, 96 D,
91.7, 656

Primary Examiner—Robert F. White
Assistant Examiner—Jeffery R. Thurlow
Attorney—Wenderoth, Lind & Ponack ABSTRACT: A light-polarizing film of a polymer selected from the group consisting of polyvinyl chloride, polyvinyl bromide and polyvinylidene chloride is produced by heating the polymer at a temperature of 90°–150° C. in the presence of a tertiary aliphatic amine having a boiling point higher than 90° C. as dehydrohalogenating agent to cause partial dehydrohalogenation, heating the product at a temperature of 70°–150Φv C. to produce conjugated double bond chains, and then molecularly orienting the product in at least one direction by stretching the product more than 1.2 times its length at a temperature above 100° C.

PRODUCTION OF LIGHT-POLARIZING FILM

This invention relates to an improved light-polarizing film and also to the production thereof.

A conventional light-polarizing film is produced by impregnating a film of polyvinyl alcohol or its derivative with an aqueous solution of a light-polarizing element (such as iodine or a dichromic dye) or an agent forming a dichromic light-polarizing element and then thermally stretching the film several times the length so that high molecular micelles are unidirectionally oriented. However, the base material in this case is of a water-soluble high molecular weight substance, and therefore the resulting light-polarizing film is low in the resistance to water so that it deteriorates even with the slightest moisture in air.

There has been suggested a method for overcoming such drawback, for example, by applying a chemical treatment to such light-polarizing film or by laminating the light-polarizing film between supporting or protecting films or sheets such as of a plastic (for example, butylcellulose acetate) or glass. However, the operation is complicated. Particularly, in the case of the former, the stretching operation is difficult and no sufficient light-polarizing characteristic can be obtained. In the latter, it is technically difficult to obtain a light-polarizing sheet of such small thickness in the order of several to 10 microns.

In either method, it is a difficult and troublesome operation to uniformly impregnate the light-polarizing base material with a light-polarizing element or an agent forming a light-polarizing element. Further, the light-polarizing element or the agent forming a dichroic light-polarizing element adsorbed by the impregnation will be released from the film and diffused into air while the film is left standing. Further, according to these conventional methods a light-polarizing film of a large size can not be produced in a mass-production system.

The present invention is to provide a process for producing light-polarizing films excellent in the performances without such drawbacks as in the conventional process explained hereinbefore.

Therefore an object of the present invention is to provide a light-polarizing film excellent in the light-polarizing characteristics and high in the resistance to water and heat.

Another object is to provide a process for producing such films easily in a mass-production system.

Other objects of the invention will be apparent from the following description.

Briefly the method of this invention comprises a first step of partially dehydrohalogenating a polymer selected from the group consisting of polyvinyl chloride, polyvinyl bromide and polyvinylidene chloride so as to obtain a yellowish reaction product, a second step of heating said first step reaction product until it becomes blue, red or purple so as to promote the growth of conjugated double bond chain grow and a third step of molecularly orienting the second step reaction product at least in one direction.

The present invention will be explained in more detail referring partly to the accompanying drawings wherein.

In carrying out the invention, any polyvinyl chloride, polyvinyl bromide and polyvinylidene chloride may be employed so far as it has film-forming property. If desired, a mixture of different polymers selected from the above group may be employed.

The first step of the invention, i.e. the partial dehydrohalogenation of the above mentioned polymer may be carried out in the presence of a known dehydrohalogenating agent such as alkali hydroxide, sodium alkoxide, potassium alkoxide, liquid ammonia, dimethylformamide-lithium chloride solution, cyclohexylamine or n-butylamine. However, such known dehydrohalogenating agent has drawbacks that, in the treatment of the polymer in the form of a film, it is difficult to effect uniform reaction without impairing the form (shape) and transparency of the film and that a substituting reaction will also occur during the dehydrohalogenation so that the growth of the conjugated double bond chain of the first step reaction product will be obstructed in the subsequent second step. Therefore, it is preferable to use in the first step such dehydrohalogenating agent which will not impair the form and transparence of the film, will cause no such substituting reaction and will enable the quantitative control of the dehydrohalogenating reaction. We have found that a tertiary aliphatic amine of a boiling point higher than 90° C. such as tri-n-propylamine or tri-n-butylamine, or N,N-dialkylamide such as dimethylformamide is especially suitable as the dehydrohalogenating agent.

This first step reaction or dehydrohalogenation is carried out in respect of the above-mentioned polymer in the form of a film, solution or suspension. When a film is to be treated, it should be able to be stretched more than 1.2 times, preferably about 2 to 5 times the length in at least one direction after the second step to be explained hereinafter. It is also necessary to employ a proper system so that the film may not dissolve during the reaction. It is preferable to carry out the partial dehydrohalogenation of the film in the presence of the above-mentioned dehydrohalogenating agent, preferably the above-mentioned tertiary aliphatic amine at a temperature of 90° to 150° C.

In the case of carrying out the first step reaction (dehydrohalogenation) in respect of a solution or suspension, the above mentioned polymer is dissolved in a solvent such as cyclohexanone, nitrobenzene, pyridine or dichlorethane and is subjected to reaction at 90° to 150° C. in the presence of the above-mentioned dehydrohalogenating agent, preferably the above-mentioned tertiary aliphatic amine or N,N-dialkylamide.

In the first step, with the progress of the reaction, the colorless polymer will be successively colored to yellow, brown, reddish purple and toward black. In the present invention, the first step reaction is stopped while the reaction product is yellow. If the first step reaction is allowed to progress in excessive conversion until the reaction product becomes brown or black, an excessive absorption will be observed in a visible light range and it will become difficult to obtain a film having an adequate transmittance in a visible light range. Further, under such excessive conversion (reaction), molecular crosslinking will progress, so that the physical properties of the film will be reduced and an undesirable influence will be given to the second step reaction for growing a conjugated double bond chain length.

It has been confirmed from the visible light transmittance curve that, in yellowish reaction product of the first step double bonds produced by the partial dehydrohalogenation are distributed at random in the molecule and partially there are present polyene chains with up to 10 conjugated double bonds. The average dehydrohalogenation degree is 2 to 20 mol percent based on the monomers forming the polymer employed. When the first step reaction product is used to be cast into film it is preferable to control the dehydrohalogenation degree within 3 to 10 mol percent. When the first step reaction product is mixed with another compatible polymer and is then cast into film or when said reaction product is to be applied to coat another stretchable plastic film, it is preferable to control the dehydrohalogenation degree within 10 to 20 mol percent.

After the first step reaction, the reaction product, when it is in the form of film, is dried if desired, and then subjected to the second step reaction. When the first step reaction product is in the state of a solution or suspension, it is put into a nonsolvent such as methanol or ethanol so as to precipitate the polymer, which is then dried at a temperature below 50° C., preferably under a reduced pressure to obtain a yellowish polymer powder. The yellow powder is dissolved into a solvent and cast into a film by an ordinary process. The cast film is then subjected to the second step reaction. Alternatively, the yellow powder is mixed with other film-forming polymer compatible therewith, for example polyvinyl chloride, polyvinyl bromide or polyvinylidene chloride, and is cast into a film by an ordinary process. The film is then subjected to the second step reaction. Further, if desired, said yellow powder dissolved in a solvent is applied to coat another stretchable plastic film, which is then subjected to the second step reaction.

The second step reaction may be carried out by dry-heating or wet-heating the film in the air or in a nitrogen or other inert gas stream preferably at 70° to 150° C. The time of heating varies depending on the temperature. In any case the heat treatment is conducted until the product or film becomes blue, red or purple due to the growth of conjugated double bond chain. By this second step reaction or heat treatment, the polyene chains with up to 10 conjugated double bonds partially present in the molecule of the first step reaction product will grow and there will be obtained a film in which polyene chains with 10 to 20 conjugated double bonds are linked in the molecule. Particularly a film having 15 to 16 conjugated double bonds chains is most preferable because it shows a maximum absorption near 550 1$82 in the visible light transmittance curve. It is thus observed from the visible light transmittance curve that the conjugated double bond chain length grows by said second step reaction. If the second step reaction is proceeded excessively, the film will become black and there will not be obtained a film having an adequate transmittance in the visible light range.

After the second step or heat treatment, the film is stretched. In the case of monoaxial stretching, it is preferable to stretch the film more than 1.2 times the length, preferably 2 to 4 times while heating the film at a temperature above 100° C. In the case of biaxial stretching, the film is stretched in two directions substantially at right angles separately or simultaneously at a temperature at least 10° C. higher than the softening point of the film. When the film is to be stretched in two directions separately, it is first stretched preferably about 2.0 times or less in a direction substantially at right angles to the longitudinal direction at a temperature at least 10° C., preferably 15° to 40° C. higher than the softening point of the film and is then stretched more than 1.2 times, preferably about 2.3 to 7.0 times the length in the longitudinal direction at a temperature higher than in the first stretching. When the stretching ratio in two directions is at least 1.5, preferably 2.0–5.0, there will be obtained a light-polarizing film of excellent performances. In the case of stretching the film in two directions simultaneously, it is preferable to stretch it at the same stretching multiplication rate as in stretching in two directions separately at a temperature at least 15° C. higher than the softening point of the film, in order to biaxially orient the molecule micelles. The closer to 1 the stretching ratio (in the two directions) of the thus biaxially stretched light-polarizing film, the lower its light-polarizing characteristics but the higher its mechanical physical properties in both longitudinal and lateral directions. This is favorable in the case of using the film under severe conditions.

While the above explanation has been directed to the second step or heat treatment of the product in the form of film, it is possible to subject the powder obtained by the first step reaction to the second step reaction. The powdery product resulting from the second step is mixed with another polymer compatible therewith and is cast into a film, which is then stretched in the same manner as explained before. Particularly, a light-polarizing film obtained by mixing the powdery second step reaction product and powdery first step reaction product, casting the mixture into a film and stretching the same has a light-polarizing property in a wide visible light range close to gray. It is also possible to produce a light-polarizing film by applying a solution of the powdery second step reaction product or the above-mentioned mixture of the powdery first step reaction product and powdery second step reaction product to coat another stretchable plastic film and then stretching the same to orient the molecules.

The light-polarizing film produced by the present invention is hydrophobic in contrast to conventional polyvinyl alcohol or its derivative so that it will not be dissolved, swollen or devitrified when exposed to water.

Further, the conventional polyvinyl alcohol light-polarizing film shrinks in hot water at about 40° C. to impair the orientation of high molecular micelles, but the light-polarizing film of the present invention is stable even in hot water at 80° to 90° C. Further the light-polarizing film and its production according to this invention have no such drawbacks as explained hereinbefore in respect of conventional light-polarizing film of polyvinyl alcohol or its derivatives.

The light-polarizing films of this invention are useful in various applications such as building materials, panels, window glasses, sun-visors, glare masks, room partitions, television picture surface protective films, sun glasses, etc.

The following examples illustrate the invention, wherein all the parts are by weight.

EXAMPLE 1

Eight parts of a commercial polyvinyl chloride (average polymerization degree: 1,000) were dissolved into 100 parts of cyclohexanone. To this solution were added 71 parts of tri-n-butylamine and the reaction was allowed to proceed at 140° C. for 90 minutes. Then the solution was poured into methyl alcohol to precipitate the reaction product (partly dehydrohalogenated polymer). The precipitate was recovered, washed and then dried for 12 hours at 40° C. under a reduced pressure to obtain a light yellow powdery first step reaction product. Upon analysis, the amount of the remaining chlorine was 55.4 percent. Therefore, the dehydrochlorination degree was about 5 mol percent based on the monomer constituting the polyvinyl chloride. The first step reaction product was dissolved into cyclohexanone to prepare a solution of a concentration of 5 percent by weight. The solution was spread on a glass plate and was heated at 80° C. for 1 hour to volatilize the solvent to obtain a yellow transparent film of 15 microns in thickness. The yellow transparent film was heat treated as the second step at 120° C. for 15 minutes to obtain a bluish purple transparent film. This film was stretched at 100° C. 3 times the length in one direction to orient the molecules to obtain a light purple transparent light-polarizing film.

Figure 1:
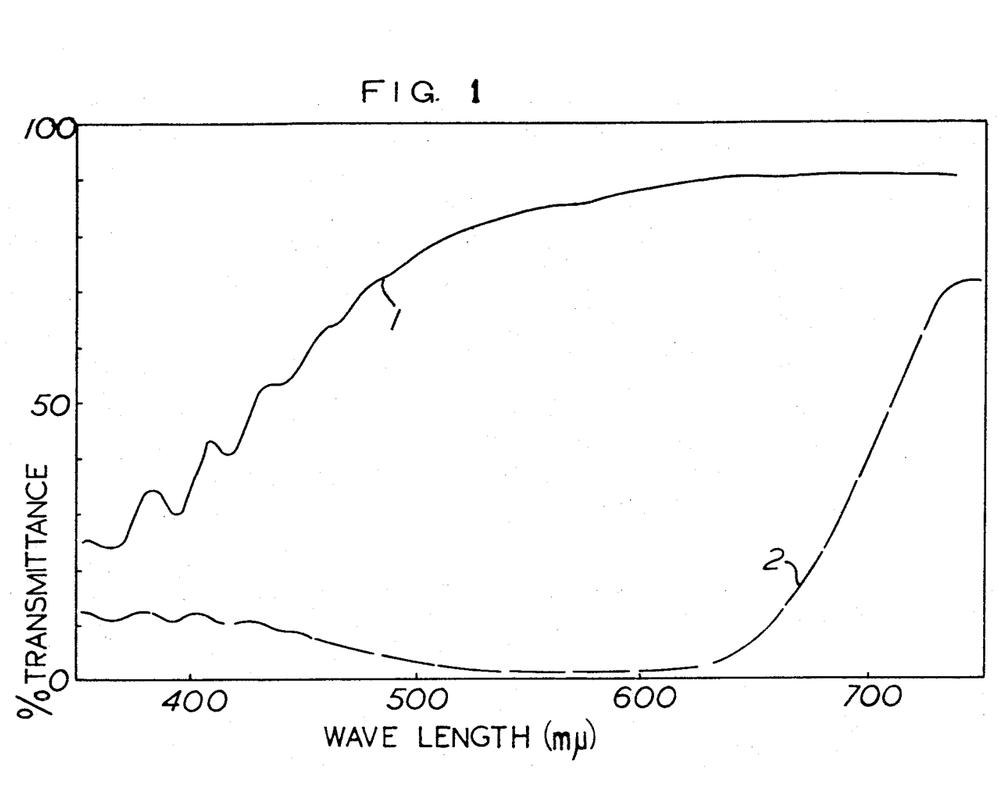
FIG. 1 is a graph showing visible light transmittance curves of the film at different production stages of this invention but before stretching.
Figure 2:
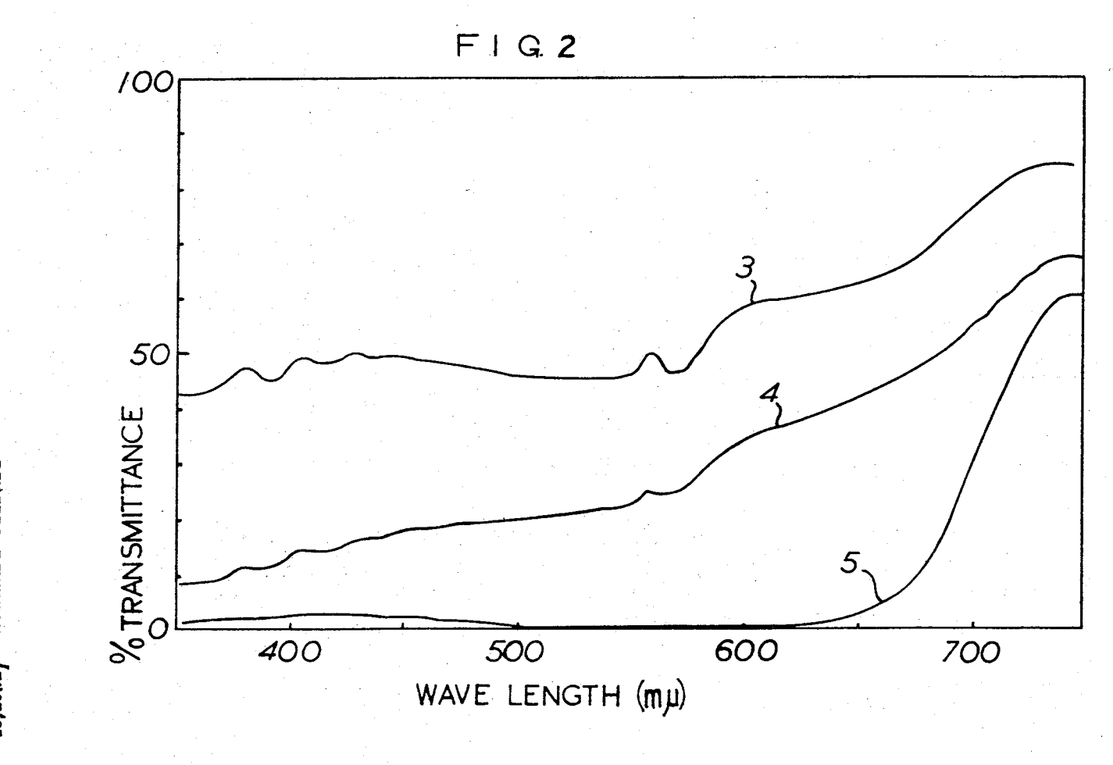
FIGS. 2, 3, 4 and 5 are graphs of visible light transmittance curves of various light-polarizing films of this invention.

The visible light transmittance curves of the film at different production stages are shown in FIG. 1 wherein the numeral 1 represents the curve of the yellow transparent film formed of the first step reaction product, while the curve 2 is for the bluish purple transparent film after the second step reaction, both before stretching. According to FIG. 1, the yellow transparent film shows maximum absorptions at 365, 392, 417 and 435 $\mu$. The bluish purple transparent film shows a maximum absorption near 600 1$82 and the presence of about 20 conjugated double bond chain is observed. FIG. 2 shows a graph similar to FIG. 1 but of light purple transparent light-polarizing film according to the present invention obtained by stretching in one direction the bluish purple transparent film represented by the curve 2 in FIG. 1. The numeral 3 indicate the curve in respect of the stretched single light-polarizing film. The curve 4 is for two of said light-polarizing films as overlapped so that the directions of the orientation are parallel with each other. The curve 5 is for two of said light-polarizing films as overlapped so that the directions of the orientation are rectangular with each other. From the curves 3 and 4 shown in FIG. 2, it will be found that the light-polarizing films obtained in this example have excellent light-polarizing characteristics.

The following table 1 shows the resistance to water of the light-polarizing film obtained in this example as compared with conventional polyvinyl alcohol light-polarizing films.

TABLE 1

| Water (°C.) | Dipping time | Shrinkage (%) Conventional Example 1 |
|---|---|---|

| (min.) | | | |
|---|---|---|---|
| 19 | 10 | 20 | |
| 40 | 1 | 22 | |
| 40 | 3 | 30 | 0 |
| 40 | 100 | — | 0 |
| 50 | 1 | — | 0 |
| 50 | 10 | — | 1.3 |
| 60 | 1 | — | 1.8 |
| 60 | 5 | — | 3.0 |
| 65 | 1 | — | 2.9 |
| 65 | 5 | — | 6.4 |
| 75 | 1 | — | 18.3 |

As evident from table 1, the light-polarizing film of this invention is higher in the water resistance than the conventional polyvinyl alcohol light-polarizing film.

The horizontal line (—) in the column of the shrinkage of the polyvinyl alcohol light-polarizing film in table 1 represents that the film shrank so much that the shrinkage could not be measured.

EXAMPLE 2

Figure 3:
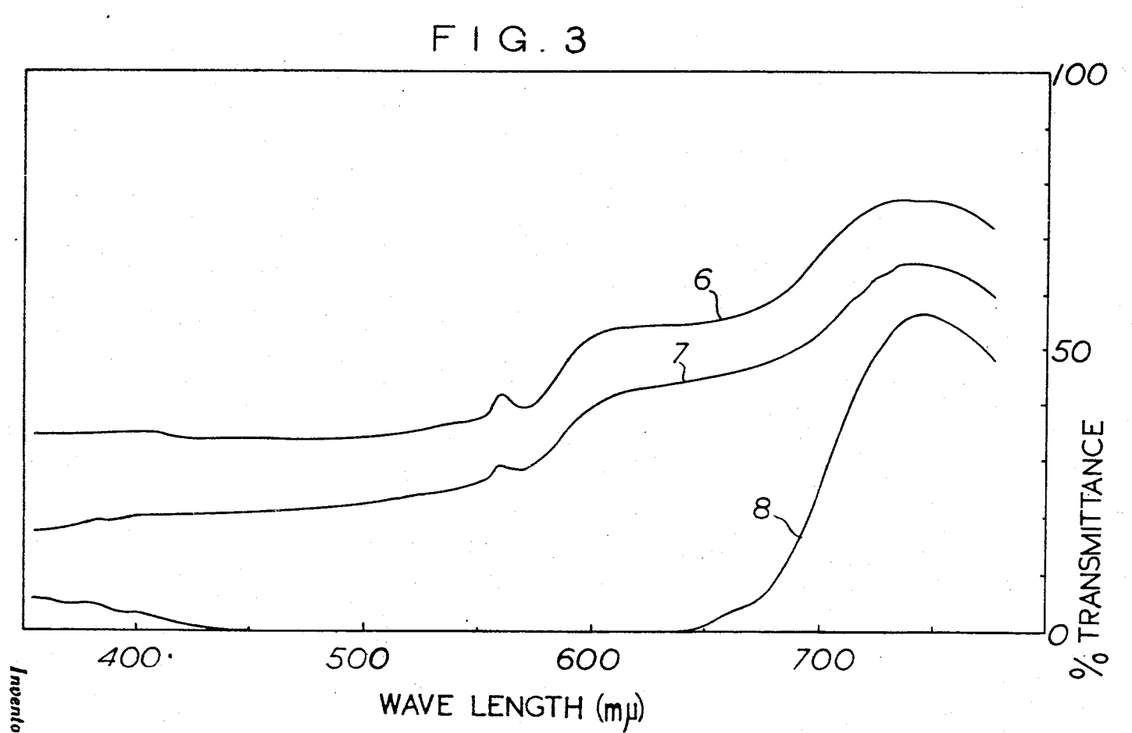

A commercial polyvinyl chloride (average polymerization degree: 1,500) film of a thickness of 20μ held by a frame made of stainless steel was immersed into a bath of tri-n-propylamine at a temperature of 110° C. for 10 minutes to obtain a light yellow transparent film with a dehydrochlorination degree of 3 mol percent. This film was heated in the air at a temperature of 130° C. for 15 minutes to obtain a bluish purple transparent film. Then it was stretched 4 times the length in one direction at a temperature of 110° C. so that the molecules are oriented to obtain a light-polarizing film having such transmittant characteristics as shown in FIG. 3 wherein the curve 6 represents the transmittance of the film of this example. The curve 7 is for two films of this example as overlapped so that the molecular orientation directions are parallel with each other and the curve 8 is for two films of this example as overlapped so that the molecular orientation directions are rectangular with each other. Further, the light-polarizing film for the respective wavelengths are shown in table 2. The light-polarization degree P the following formula:

$$P = \frac{H_0 - H_{90}}{H_0 + H_{90}}$$

wherein $H_0$ is a transmittance of two films as overlapped in the parallel position and $H_{90}$ is a transmittance of two films as overlapped in the rectangular position.

TABLE 2

| Wave length (μ) | Transmittance of single film | Transmittance in parallel position $H_0$(%) | Transmittance in rectangular position $H_{90}$(%) | Light-polarization degree (P) |
|---|---|---|---|---|
| 350 | 34.8 | 27.4 | 5.8 | 0.65 |
| 375 | 35.0 | 18.8 | 4.8 | 0.59 |
| 400 | 35.0 | 20.4 | 3.2 | 0.73 |
| 450 | 34.0 | 21.0 | 0.0 | 1.00 |
| 500 | 34.2 | 22.4 | 0.0 | 1.00 |
| 550 | 37.5 | 26.2 | 0.0 | 1.00 |
| 600 | 52.5 | 40.0 | 0.0 | 1.00 |
| 650 | 55.2 | 45.0 | 1.0 | 0.96 |
| 700 | 67.5 | 52.7 | 26.0 | 0.34 |
| 750 | 77.0 | 65.4 | 56.2 | 0.08 |

$P=1$ represents a perfect straight light-polarization and $P=0$ represents natural light. Therefore, the film of this example shows a perfect straight light-polarization at a wavelength of 450–650 μ.

EXAMPLE 3

A commercial film (thickness 50μ) of polyvinylchloride (average polymerization degree: 2,000) held by a frame made of stainless steel was immersed into a tri-n-butylamine bath to conduct the dehydrohalogenation at a temperature of 120° C. for 10 minutes to obtain a light yellow transparent film (dehydrochlorination degree: 4 mol percent). This film was then heated in the atmosphere at a temperature of 140° C. for 10 minutes to obtain a bluish purple film. This film was stretched 5 times the length in one direction at a temperature of 120° C. to obtain a light-polarizing film having excellent water resistance as shown in table 3.

TABLE 3

| Water (°C.) | Dipping time (min.) | Shrinkage (%) |
|---|---|---|
| 80 | 2 | 0 |
| 80 | 5 | 1 |
| 80 | 10 | 1.5 |
| 85 | 2 | 1.5 |
| 85 | 5 | 2.5 |
| 85 | 10 | 3 |
| 90 | 2 | 2.5 |
| 90 | 5 | 4.0 |
| 90 | 10 | 7.0 |

As is clear from table 3, the light-polarizing film of this example is more stable than that of example 1 even at a higher temperature.

EXAMPLE 4

Ten parts of commercial polyvinyl bromide (average polymerization degree: 900) were dissolved into 100 parts of dimethylformamide and the solution was heated at 130° C. for 20 minutes. Then the resulting solution was spread directly on a glass plate and the solvent was evaporated to make a yellow transparent film of 26 microns in thickness. As the second step, this film was heated at 85° C. for 10 hours to obtain a reddish purple transparent film, which was then stretched 2.5 times the length in one direction at 105° C. The light-polarizing characteristics of this film were satisfactory.

EXAMPLE 5

Eight parts of commercial polyvinyl chloride (average polymerization degree: 1,000) were dissolved into 10 parts of cyclohexanone. To this solution were added 71 parts of tri-n-butylamine and the solution was heated at 140° C. for 90 minutes. The resulting solution was poured into methyl alcohol to precipitate the reaction product. The precipitate was recovered, washed and then dried for 12 hours at 40° C. under a reduced pressure to obtain a light yellow powder (the first step reaction product). The analysis of this product indicated that the amount of the remaining chlorine was 55.4 percent. Therefore, the dehydrochlorination degree was about 5 mol percent based on the monomer constituting the polyvinyl chloride. This first step reaction product was dissolved into cyclohexanone to prepare a solution of a concentration of 5 percent by weight. The solution was spread on a glass plate and was heated at 80° C. for 1 hour to evaporate the solvent to obtain a yellow transparent film of 15 microns in thickness. Then the yellow transparent film was heated at 120° C. for 15 minutes to obtain a bluish purple transparent film. This film was stretched 1.4 times the length in the lateral direction at a temperature of 100° C. and was then stretched 3.0 times the length in the longitudinal direction at a temperature of 105° C. to obtain a light purple transparent film.

Figure 4:
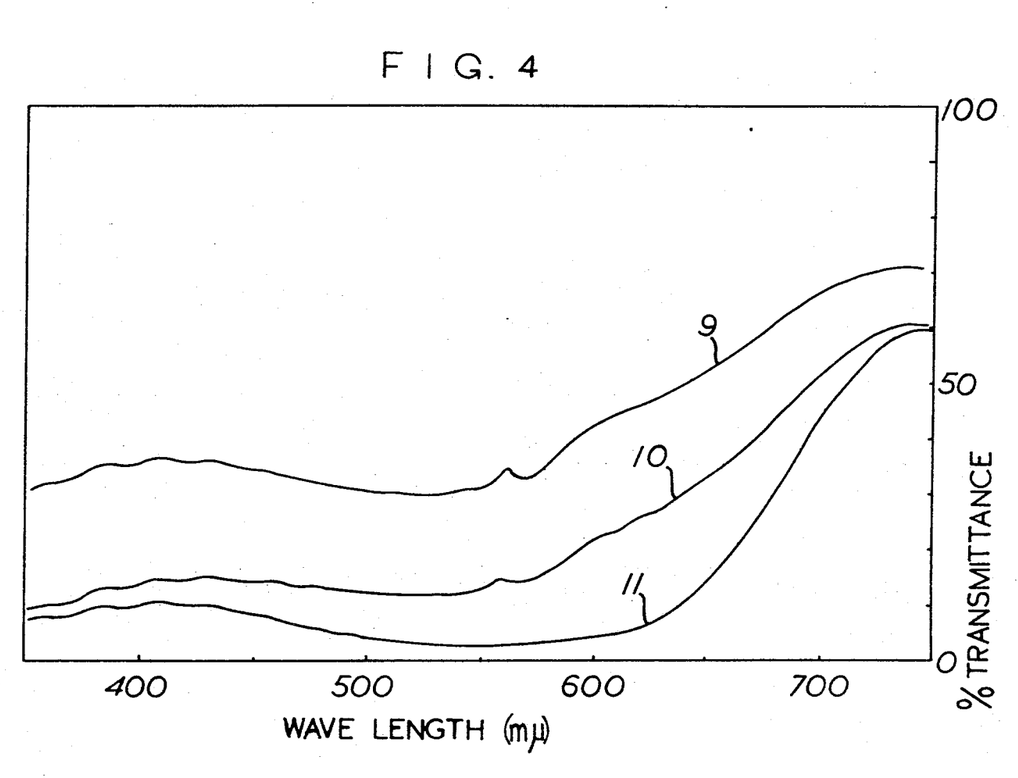

The visible light transmittance curves of light purple transparent light-polarizing films produced by this example are shown in FIG. 4 wherein the curve 9 is of a single light-polarizing film of this example, the curve 10 is of two light-polarizing films of this example as overlapped so that the directions in which the molecular orientation degree of said light-polarizing film is larger are parallel with each other and the curve 11 of two light-polarizing films of this example as overlapped so that the directions in which the molecular orientation degree of said light-polarizing film is larger are at right angles with each other.

Table 3 shows comparisons of tensile strengths in both longitudinal and lateral directions of the light-polarizing film of this example and the monoaxially stretched light-polarizing film obtained in example 1. The tensile strength was measured at a pulling speed of 500 mm./min. at a temperature of 20° C. and a humidity of 60 percent by using an autograph Model 1S-2000 made by K. K. Shimazu Seisakusho, of Kyoto Japan.

TABLE 3

| Sample | Film of this example | | Light-polarizing film of Ex. 1 | |
| --- | --- | --- | --- | --- |
| Film thickness (μ) | 19.4 | | 24.0 | |
| Stretching direction | (1) | (2) | (1) | (2) |
| Stretching ratio | 3.0 | 1.4 | 2.5 | |
| Tensile strength (kg./cm.²) | 973 | 405 | 127 | 180 |

¹ Longitudinal.
² Lateral.

As evident from table 3, when biaxially stretched, there are obtained advantages that the strength in the lateral direction becomes higher and the strength difference between the longitudinal and lateral directions becomes smaller.

Table 4 shows the water resistance of the light-polarizing film of this example. The shrinkage represents in percent the variation of the dimension in the longitudinal direction when a sample of 10×10 cm. was dipped in water.

TABLE 4

| Water temp. (°C.) | Dipping time (min.) | Shrinkage (%) |
| --- | --- | --- |
| 19 | 10 | 0 |
| 40 | 1 | 0 |
| 40 | 3 | 0 |
| 60 | 5 | 0 |
| 70 | 1 | 5 |
| 70 | 5 | 6.3 |
| 73 | 5 | 11.3 |
| 75 | 1 | 7.5 |

As evident from table 4, the light-polarizing film of this example does not shrink even at a water temperature of 60° C. and is higher in the waterproofness than the monoaxially stretched light-polarizing film shown in table 1.

EXAMPLE 6

Two parts of commercial polyvinylidene chloride were dissolved into 100 parts of cyclohexanone. To this solution were added 3.5 parts of tri-n-butylamine and heated at 150° C. for 200 minutes. Then the solution was poured into methyl alcohol to precipitate the reaction product. This precipitate was recovered, washed and was then dried for 12 hours at 40° C. under a reduced pressure to obtain a light yellow powder (the first step reaction product). Then, as the second step, the powder was heated for 30 minutes at 110° C. to obtain a bluish purple powder (second step reaction).

This second step reaction product was tubularly extruded at a temperature of 220° C. through an annular die of an extruder. The extruded tube was passed through a cooling water bath at 30° C. Then the tube was stretched simultaneously forward and sideward at a stretching ratio of 4.5 by blowing compressed air therein while heating at a temperature of 125° C. to 140° C. with an infrared ray heater to obtain a light purple transparent film. This film was somewhat lower in the light-polarizing characteristics than that of example 1 but was satisfactory in both strength and waterproofness.

EXAMPLE 7

Eight parts of commercial polyvinyl chloride powder (average polymerization degree: 1,000) were dissolved into 100 parts of cyclohexanone. To this solution were added 70 parts of tri-n-butylamine and the resulting solution was heated at 140° C. for 75 minutes. Then the solution was poured into methyl alcohol to precipitate the reaction product. The precipitate was recovered, washed and was then dried for 12 hours at 40° C. under a reduced pressure to obtain a light yellow powder (first step reaction product). The analysis of this product indicated that the amount of the remaining chlorine was 55.8 percent. Therefore, the dehydrochlorination degree was about 4 mol percent on the monomer constituting the polyvinyl chloride.

As the second step reaction, a part of this yellow powder was heated for 20 minutes at 120° C. in a vacuum to obtain a bluish purple powder. Equal parts of the yellow powder (the first step reaction product) and bluish purple powder (the second step reaction product) were mixed together and dissolved into cyclohexane to prepare a solution of a concentration of 5 percent by weight. The solution was spread on a glass plate and the solvent was evaporated at 40° C. to obtain a purplish gray brown transparent film of 15 μ in thickness.

Figure 5:
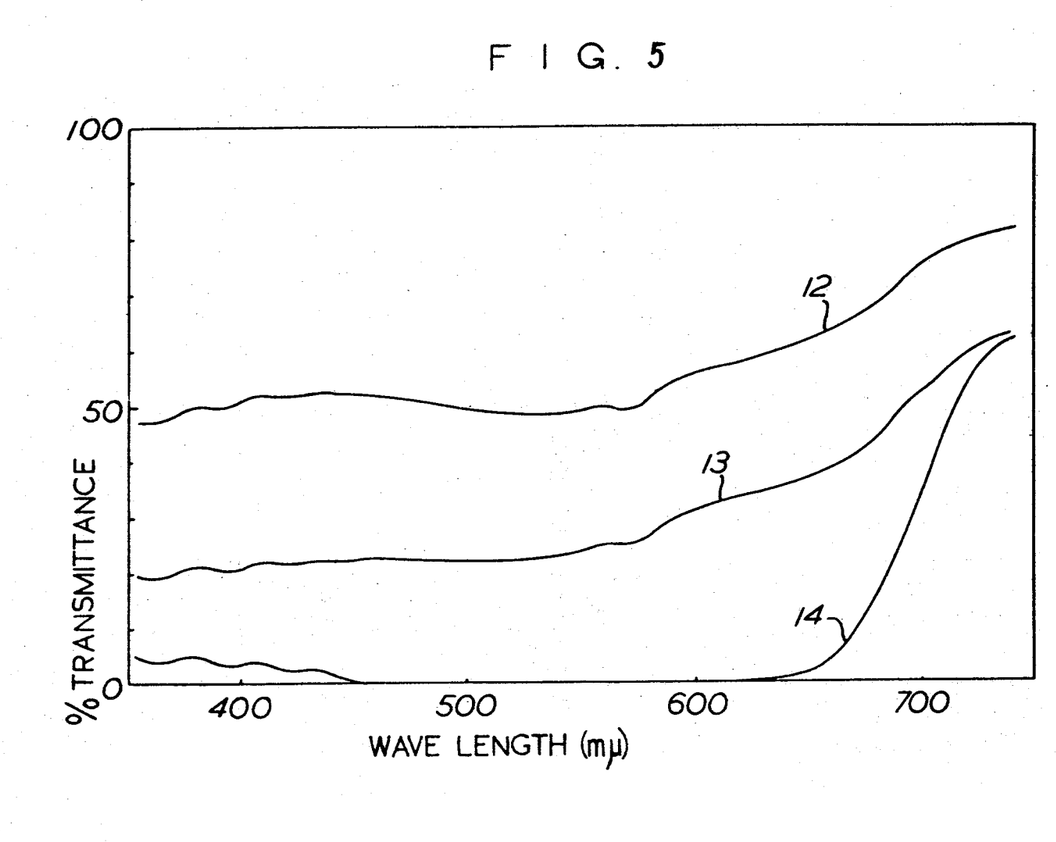

Visible light transmittance curves of light-polarizing films made by stretching this film 3.5 times the length in one direction at 110° C. are shown in FIG. 5, wherein the curve 12 is of a single film of this example, the curve 13 is of two films of this example as overlapped so that the molecular orientation directions are parallel with each other and the curve 14 is of two films of this example as overlapped so that the molecular orientation directions are at right angles with each other. As evident from FIG. 4, the film of this example has a considerably favorable light-polarization even near 400 mμ and has a light-polarizing property in a wide range of wavelengths.

EXAMPLE 8

A polyester film produced by an ordinary method was coated on the surface with a solution of a concentration of 5 percent by weight prepared by dissolving the yellow powder (first step reaction product) obtained in example 2 into cyclohexanone and was then heat treated at 120° C. for 20 minutes (the second step reaction) to make a reddish purple film. This film was stretched 1.5 times the length in the lateral direction at a temperature of 90° C. and was then stretched 3.2 times the length in the longitudinal direction at a temperature of 100° C. to obtain a film high in the light-polarizing characteristics, waterproofness and strength.

What is claimed is:

1. A process for producing a light-polarizing film of at least one film-forming polymer selected from the group consisting of polyvinyl chloride, polyvinyl bromide and polyvinylidene chloride which comprises heating the polymer at a temperature of 90° to 150° C. in the presence of a tertiary aliphatic amine having a boiling point higher than 90° C. as dehydrohalogenating agent until the average dehydrohalogenation degree reaches 2 to 20 mol percent based on the monomers forming the polymer, heating the resultant product at a temperature of 70° to 150° C. to grow conjugated double bond chains until polyene chains with 10 to 20 conjugated double bonds are linked together in the molecule, and then molecularly orienting the product in at least one direction by stretching the product more than 1.2 times its length at a temperature above 100° C.

2. A process as claimed in claim 1 wherein the dehydrohalogenating agent is an N,N-dialkylamide.

3. A process as claimed in claim 1 wherein the starting polymer is in the form of a film.

4. A process as claimed in claim 1 wherein the stretching is conducted in two directions substantially at right angles with each other.

5. A process as claimed in claim 4 wherein the stretching ratio in two directions is at least 1.5.

* * * * *